UNITED STATES PATENT OFFICE 2,436,867

WELDING ROD

Richard K. Lee, York, Pa., assignor to The McKay Company, York, Pa., a corporation of Pennsylvania No Drawing. Application January 21, 1946, Serial No. 642,445

4 Claims. (Cl. 219—8)

The present invention relates to welding rods, and, more particularly, to a new and improved welding rod which is eminently suited for the welding and repairing of switch points, cross-over frogs and the like and for similar applications where resistance to spalling, rolling-over, squashing, etc., are required. The weld metal provided by the use of my electrode is not a hard facing material as deposited, but under impact it is a rapidly work-hardenable composition and such compositions may be used for welding or repairing various types of articles where a rapidly work-hardenable surface is desired.

Switch points, cross-over frogs and the like are subjected to great stresses in normal usage and, as a consequence, spalling, rolling-over, squashing, etc., frequently result. Heretofore in repairing damaged points, frogs and the like it has been necessary to subject the part to preconditioning operations such as cutting, grinding, etc., before applying the new metal. It has also been necessary to preheat the part before welding, and, occasionally, it has been necessary to peen the weld metal during welding. I have found that, where my new and improved welding rod is employed, these conditioning operations may be dispensed with and that the worn or broken parts may be built up by applying the weld metal directly to the part. After a sufficient amount of the weld metal has been deposited, it is merely necessary to grind the article to the proper size and shape. Thus, in the repairing of such articles many of the operations usually required are wholly eliminated.

In accordance with my invention, I provide a welding rod whose coating and alloy core wire between them will deposit at the weld locus an austenitic, rapidly work-hardenable weld metal whose analytical limits are set forth below. As in familiar commercial practice, the major portion of alloy metal content of the deposit is contributed by the core wire and the coating is used to control the analysis by furnishing small increments or additions to the weld metal. The coating of the rod is preferably of the so-called "lime" type or the "titania" type.

I have found that the desired results can be obtained by using a weld rod which will deposit at the weld locus a weld metal having the following analysis:

|  | Per cent |
|---|---|
| Carbon | 0.55 to 0.70 |
| Manganese | 3.50 to 4.50 |
| Silicon | 0.50 to 0.70 |
| Chromium | 19.00 to 20.50 |
| Nickel | 9.00 to 10.00 |

In the foregoing analysis the balance is substantially all iron except for the usual impurities found in commercial steels.

A weld metal analysis of the character just stated may be obtained by using a weld rod having a steel core wire and a lime or titania type coating thereon, the core wire being of approximately the following analysis:

|  | Per cent |
|---|---|
| Carbon | 0.15 |
| Manganese | 2.00 to 4.75 |
| Silicon | 0.60 |
| Chromium | 19.5 to 22.00 |
| Nickel | 9.0 to 10.5 |

The weld metal analysis to be employed in any specific instance will depend upon the particular application and the composition of the metal to which the weld metal is applied. The weld metal analysis set forth above is merely a preferred analysis and substantial departures therefrom may be made without departing from the present invention. For example, the specific composition stated may be varied within the following limits:

|  | Per cent |
|---|---|
| Carbon | 0.55 to 0.90 |
| Manganese | [1] 1.5 to 5 |
| Silicon | 0.10 to 1.0 |
| Chromium | 16.5 to 22.0 |
| Nickel | 6 to 12 |
| Molybdenum | 0 to 3.0 |

[1] Preferably 2.0 to 4.50 per cent.

A preferred commercial range of analysis of the weld metal is

|  | Per cent |
|---|---|
| Carbon | 0.60 to 0.70 |
| Manganese | 3.50 to 4.50 |
| Silicon | .40 to .80 |
| Chromium | 16.5 to 22.0 |
| Nickel | 6.0 to 12.0 |
| Molybdenum | 0 to 2.0 |

Other metals may be included in the weld metal without altering the essential behavior of the weld metal deposit. For example, molybdenum in amount from 0.01% to 3% may be used. When 2% molybdenum is used, it imparts some extra strength to the weld metal, reduces its deformability and makes the deposit work harden at a somewhat faster rate. Also, tungsten or cobalt may be used in amounts from 0.01% to 3%.

This application is a continuation-in-part of my application Serial No. 534,378, filed May 5, 1944, for Welding rods, now abandoned.

While I have set forth herein a preferred composition for the weld metal and certain limits within which the constituents may be varied, it will be understood that my invention is not limited thereto but may be otherwise embodied within the scope of the appended claims.

I claim:

1. A welding rod comprising a core wire and a coating thereon, the core wire and coating being of such composition as to deposit at the weld locus a weld metal comprising carbon from 0.55 to 0.90%, silicon from 0.10 to 1.0%, nickel from 6 to 12%, chromium from 16.5 to 22%, and manganese from 1.5 to 5.0, the balance being substantially all iron except for the impurities usually found in commercial steels and the weld metal being at least in part austenitic and rapidly work hardenable.

2. A welding rod comprising a core wire and a coating thereon, the core wire and coating being of such composition as to deposit at the weld locus a weld metal comprising carbon from 0.55 to 0.90%, silicon from 0.10 to 1.0%, nickel from 6 to 12%, manganese from 2 to 4.5%, and chromium from 16.5 to 22%, the balance being substantially all iron except for the impurities usually found in commercial steels and the weld metal being at least in part austenitic and rapidly work hardenable.

3. A welding rod comprising a core wire and a coating thereon, the core wire and coating being of such composition as to deposit at the weld locus a weld metal comprising carbon from 0.55 to 0.90%, silicon from 0.10 to 1.0%, nickel from 6 to 12%, chromium from 16.5 to 22%, molybdenum from 0.01 to 2.0%, and manganese from 1.5 to 5.0%, the balance being substantially all iron except for the impurities usually found in commercial steels and the weld metal being at least in part austenitic and rapidly work hardenable.

4. A welding rod comprising a core wire and a coating thereon, the core wire and coating being of such composition as to deposit at the weld locus a weld metal comprising carbon from 0.55 to 0.90%, silicon from 0.10 to 1.0%, nickel from 6 to 12%, chromium from 16.5 to 22%, molybdenum from 0.01 to 2.0%, and manganese from 2 to 4.5%, the balance being substantially all iron except for the impurities usually found in commercial steels and the weld metal being at least in part austenitic and rapidly work hardenable.

RICHARD K. LEE.

REFERENCES CITED

The following references are of record in the file of this patent:

UNITED STATES PATENTS

| Number | Name | Date |
|--------|------|------|
| 1,762,483 | Norwood | June 10, 1930 |
| 2,156,299 | Leitner | May 2, 1939 |
| 2,240,672 | Scherer | May 6, 1941 |
| 2,310,341 | Arness | Feb. 9, 1943 |
| 2,343,643 | Cape | Mar. 7, 1944 |